Dec. 26, 1939.   V. J. CHAPMAN   2,184,335
ARC WELDING
Filed Sept. 16, 1938
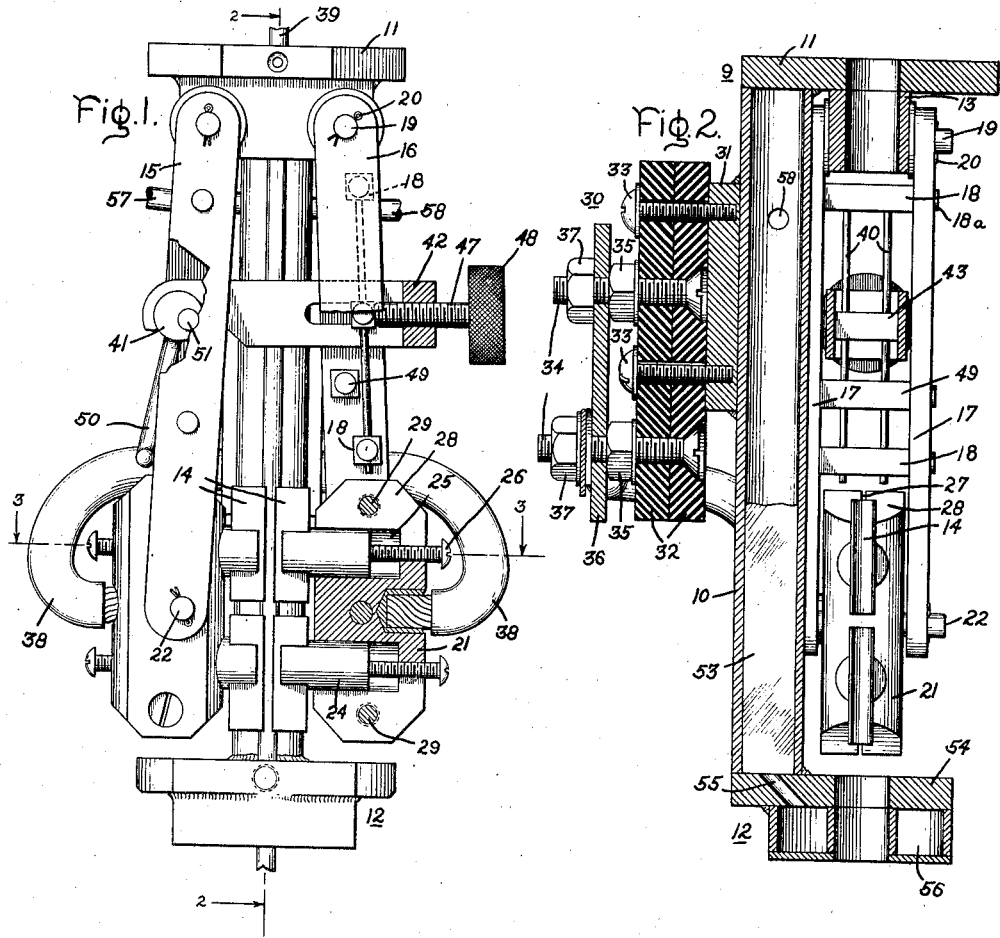
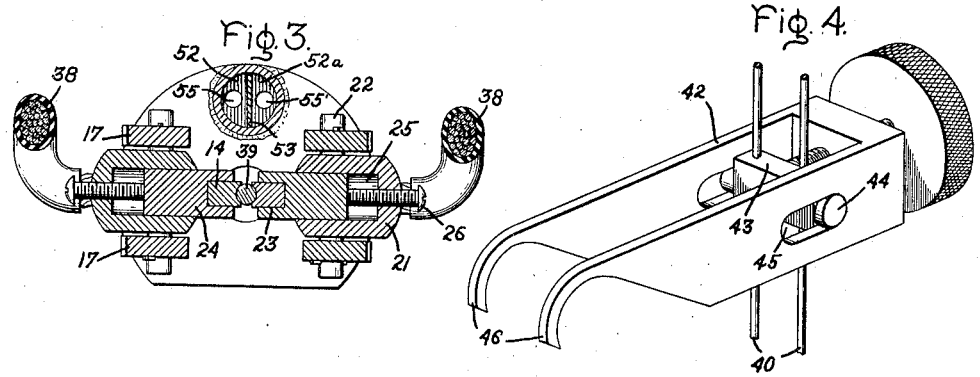
Inventor:
Verni J. Chapman,
by Harry E. Dunham
His Attorney.

Patented Dec. 26, 1939

2,184,335

UNITED STATES PATENT OFFICE 2,184,335

ARC WELDING

Verni J. Chapman, Schenectady, N. Y., assignor to General Electric Company, a corporation of New York Application September 16, 1938, Serial No. 230,265

8 Claims. (Cl. 219—8)

My invention relates to arc welding and more particularly to contact making mechanism for automatic arc welding apparatus.

In automatic arc welding machines, the electrode is usually fed from a spool so that a considerable length can be provided which is advantageous whenever continuous welding is to be performed. Such an electrode is connected to the welding circuit through brushes or contact members which engage the electrode as it passes through the brush mechanism. In this type of apparatus it is advantageous to provide simple and efficient means which will compensate for wear of the brushes and provide between the brushes and the electrode a proper contact pressure which can be readily adjusted for different sizes of electrodes. Accordingly, it is an object of my invention to provide a contact making mechanism embodying these advantages.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a side elevation, partly in section, of a current collecting apparatus embodying my invention; Fig. 2 is a sectional view taken along the line 2—2 of Fig. 1; Fig. 3 is a sectional view taken along the line 3—3 of Fig. 1; and Fig. 4 is an enlarged perspective view of a detail of the contact mechanism.

The contact making mechanism according to my invention comprises a water cooled frame 9, and nozzle block 12, which at its upper end provides pivotal support for one of the ends of two levers 15, 16. Contact blocks 21 are pivotally attached to the other ends of the levers, these blocks being provided with contact brushes 14, which engage the electrode 39 as it is fed through the contact mechanism. The blocks and brushes are biased toward one another into engagement with the electrode by a spring 40 supported in one of the levers and acted on by a clamp 42 which engages the spring as well as the other lever. Means is provided to quickly and simply release the clamp as, for example, when it is desired to thread a new electrode through the contact mechanism. I also provide means for adjusting the tension of the spring so that the proper contact pressure may be obtained for various sizes of electrode.

The above-mentioned frame includes a tubular member 10. A plate 11 is secured as by welding, for example, to the upper end of member 10 and is adapted to be attached by any suitable means, not shown, to an electrode feeding mechanism. A double-walled nozzle block 12 is suitably secured as by welding to the lower end of the member 10. It will be understood that the electrode is fed downwardly through the illustrated openings in plate 11, guide block 13 suitably attached thereto, as by welding, and nozzle block 12.

Two levers 15 and 16 are pivotally supported on guide block 13. Each lever comprises two spaced-apart arms 17 separated by spacer blocks 18. The spacer blocks 18 are maintained in position by extensions 18a which fit corresponding holes or recesses in the arms 17. The upper end of each lever is pivotally supported from the guide block 13, as by means of a shaft 19. Cotter pins 20 may be used to prevent the shaft from working out of the guide block during operation of the mechanism.

Contact blocks 21 are similarly supported from the lower ends of the levers 15 and 16. In the arrangement illustrated a shaft 22 is passed through each contact block 21, the shafts being free to turn in suitable openings or recesses in the lower ends of the levers. Cotter pins may be employed as above to prevent the shafts from working out of the contact blocks. Each contact block is provided with brushes 14. In the herein discussed embodiment of my invention I have illustrated two brushes in connection with each contact block but it will be obvious that any number of brushes may be employed.

Each brush 14 is provided with a curved face to insure engagement with a relatively large portion of electrode surface. The brushes 14 are suitably secured, as by welding, in a groove 23 cut in one end of a cylindrical arm 24. The arms 24 fit into recesses 25, formed by drilling, for example, in the contact blocks 21 and extend into the recesses 25 a distance which is determined by the position of adjusting screws 26. In order to prevent turning of the cylinder 24 in the recess 25 and the resulting misalignment between brushes and electrode, I have formed lips 28 in the blocks 21 by vertically slitting the ends of the block as indicated at 27 in Fig. 2. After adjusting the position of the arm 24 lengthwise of the recess 25 by means of the screw 26, and turning the arm 24 and brush 14 into the proper position for engagement with the electrode the lips 28 are drawn together by tightening screws 29 thereby preventing any movement of the brush with respect to the contact block 21, except after loosening screws 29. Any other suitable means to align the brushes may be used. For instance, a set screw or a suitable key and groove arrangement might be substituted for the above described construction.

Each contact block is electrically connected to a terminal block 30 to which one of the welding cables may be attached. The terminal block 30 comprises a supporting block 31 suitably secured as by welding to the frame member 10 and layers of insulation 32 secured to the block 31, as by means of screws 33. Terminals 34, as illustrated, comprise screws passing through the layers of insulation and are secured by nuts 35. The terminals 34 are joined by a conducting member 36 secured by nuts 37. A cable 38 extends from each of the contact blocks 21 to the lower terminal 34 of the terminal block.

I have provided means to urge the brushes 14 into engagement with electrode 39 as it passes through the contact mechanism. This means includes two springs 40 supported in lever 16 by the spacer blocks 18. A block 43 is suitably secured to the springs 40 intermediate the ends thereof and is provided at either end with an extension 44 which is adapted to fit within a slot 45 in each arm of the U-shaped clamp 42. As shown in Fig. 4, the clamp 42 is provided at its open end with curved arms 46 which are adapted to engage the curved surface of a cylindrical latch member or block 41 eccentrically supported in the other lever 15.

In order to adjust the spring tension and to draw the levers together, I provide a threaded screw 47 having a knurled knob 48 which is arranged to bear against one side of the bar 43. If desired, the bar 43 may be provided with an indentation to guide the end of screw 47. It will be apparent that as screw 47 is threaded into the clamp that brushes 14 will be resiliently biased into engagement with the electrode 39. Any wear of the brushes 14 will be automatically compensated for due to the tension of springs 40 tending to force the brushes 14 toward each other. Any variations in the diameter of the electrode or any kinks in the electrode will not interfere with the proper fitting of the electrode to the work inasmuch as the brushes 14 will tend to be forced apart by any increases in the size or shape of the electrode against the tension of spring but the spring bias will tend to press the brushes together in the converse situation. The pivotal arrangement of the levers and contact blocks 21 is of particular value whenever the electrode is bent or kinked because the entire brush mechanism is adapted to shift in such a manner as to compensate for such irregularities. The contact pressure may be varied readily for any size of electrode within the capacity of the apparatus by adjustment of the screw 47.

As illustrated in Figs. 1 and 2, a block 49 is supported in lever 16 adjacent springs 40 between the lower spacer block 18 and the bar 43. Block 49 serves as a stop limiting to some extent the flexing of springs 40 as screw 47 is tightened. It will be seen also that when springs 40 are flexed sufficiently to engage block 49 the effective length of the springs 40 will be shortened so that in effect the stiffness of the springs 40 is increased or decreased according to whether or not the springs engage the block 49.

Means to release the clamp quickly and simply has been provided. To this end I provide means to rotate latch block 41 as by a handle 50. As handle 50 is moved in a clockwise direction from the position shown in Fig. 1, the latch block 41 will be rotated about the eccentric pivot 51 to release the clamp 42 and, therefore, the clamping pressure. The concentration of weight in the base portion of the clamp 42, due to the location of screw 47 and knob 48, then will cause rotation of clamp 42 out of engagement with latch block 41, that is, in a clockwise direction about bar 43 as a pivot point as viewed in Figs. 1 and 4. The clamp 42 will also slide on extension 44 of bar 43 away from the latch block 41.

In order to re-enegage the brushes and electrode, the clamp 42 may be swung in a counter-clockwise direction and also slid to the left on extensions 44 into engagement with the latch block 41 following which the handle 50 may be moved in a counter-clockwise direction into the position shown in Fig. 1. During this operation, latch block 41 will tend to force the clamp 42 toward the left as viewed in Fig. 1 thus gradually increasing the clamping pressure.

It will be observed that the frame of the contact mechanism is so constructed as to fully expose one side of the levers 15 and 16 and the contact blocks 21 thus facilitating threading the electrode through the mechanism as well as simplifying the adjustment of the mechanism.

When high values of welding current are encountered it has been found necessary to cool the nozzle block of the apparatus. For this purpose, I have arranged conduits within frame 10 communicating with a passage through the nozzle block. A passage 56 is provided in any suitable manner within the nozzle block 12. For instance, intersecting passages may be drilled into the block, the open ends being closed by plugs. Fig. 2 shows concentric cylinders having the space therebetween closed by flat rings secured to the cylinders in some suitable fashion, as by welding. Frame member 10 is divided into two longitudinal passages 52 and 52a by means of a partition 53. Passages 55 and 55' through the upper ring 54 of nozzle block 12 join passage 56 and the longitudinal passages 52 and 52a, respectively. Passage 52 is provided with an inlet 57 for cooling medium and the other longitudinal passage 52a, is provided with an outlet conduit 58. Rubber tubes, not shown, may be utilized to convey the cooling medium to and from the apparatus. The cooling medium flows into the upper end of passage 52 through the inlet 57, down through the frame member 10 and passage 55 into the passage 56. After circulating through the nozzle block 12 the medium flows upwardly through passage 55' into passage 52a in frame member 10 to the outlet conduit 58. By placing the inlet and outlet conduits toward the upper end of frame member 10, a certain amount of cooling is provided at the terminal 30 and the inlet and outlet conduits are sufficiently removed from the point of greatest heat, that is, the nozzle block, to permit the use of rubber hose connections.

While I have shown a particular embodiment of my invention in connection with arc welding apparatus, I do not desire my invention to be limited to the particular construction shown and described and I intend in the appended claims to cover all modifications within the spirit and scope of my invention.

What I claim as new and desire to secure by Letters Patent of the United States is:

1. Contact making mechanism for supplying welding current to an electrode comprising a frame, contact blocks pivotally arranged with respect to said frame, electrode engaging brushes supported by said contact blocks, and means to bias said brushes into frictional engagement with said electrode including resilient means associated with one of said contact blocks, and clamping means associated with said resilient means and another of said contact blocks.

2. Contact making mechanism for supplying welding current to an electrode comprising a frame, contact blocks pivotally arranged with respect to said frame, electrode engaging brushes carried by said contact blocks, means to bias said brushes into engagement with said electrode including resilient means associated with one of said contact blocks, adjustable clamping means engaging said resilient means and another of said contact blocks, and means adapted to be engaged by said resilient means after a predetermined deflection of said resilient means for increasing the stiffness thereof.

3. Contact making mechanism for supplying welding current to an electrode comprising a frame, a pair of levers supported on said frame, contact blocks associated with said levers, said contact blocks including a brush for engaging a welding electrode as said electrode is fed through the mechanism, means to bias said brushes into contact with said electrode including resilient means supported on one of said levers, and clamping means for engaging said resilient means and the other of said levers.

4. Contact making mechanism for supplying welding current to an electrode comprising a frame, a pair of levers pivotally supported on said frame, contact blocks pivotally supported on each of said levers, electrode engaging brushes attached to said contact blocks, and means to bias said brushes into engagement with an electrode as said electrode is fed through the mechanism said means including resilient means associated with one of said levers and clamping means engaging said resilient means and the other of said levers.

5. Contact making mechanism for supplying welding current to an electrode comprising a frame, a pair of levers supported on said frame, contact blocks associated with said levers, an electrode engaging brush carried by each of said blocks, means to bias said brushes into contact with said electrode including resilient means supported on one of said levers, adjustable clamping means adapted to engage said resilient means and the other of said levers, means to disengage said clamping means, said frame and said levers being constructed so that one side of said levers and said contact blocks are fully exposed to facilitate threading said electrode through the mechanism and adjustment of said clamping means.

6. Welding apparatus comprising a frame, a pair of levers pivotally supported on said frame, contact blocks supported by said levers, each of said contact blocks being provided with a brush arranged to engage a welding electrode as said electrode is fed through the mechanism, spring means supported on one of said levers, clamping means adapted to engage said spring means and the other of said levers whereby said brushes are resiliently biased toward each other into engagement with said electrode, means to adjust the tension of said spring to obtain the proper contact pressure on said electrode, and means to release said clamping means.

7. Welding apparatus comprising a frame, a pair of levers pivotally supported on said frame, contact blocks supported by said levers, each of said contact blocks being provided with a brush arranged to engage a welding electrode as said electrode is fed through the contact mechanism, spring means supported on one of said levers, an eccentrically mounted latch member supported on the second lever, clamping means adapted to engage the spring means and said latch member whereby said brushes are resiliently biased toward each other into engagement with said electrode, means to adjust the tension of said spring means to obtain the proper contact pressure on said electrode, and means associated with said latch member to release said clamping means, said frame being so constructed that one side of said levers and said contact blocks are fully exposed to facilitate threading said electrode through the mechanism and adjusting said adjusting means.

8. Contact making mechanism for supplying welding current to an electrode comprising a frame, a pair of levers pivotally supported on said frame, contact blocks pivotally supported on each of said levers, electrode engaging brushes attached to said contact blocks, and means to bias said brushes into engagement with an electrode as said electrode is fed through the mechanism said means including resilient means associated with one of said levers and clamping means engaging said resilient means and the other of said levers, a hollow nozzle block attached to said frame, and means to circulate a cooling medium through said frame and nozzle block including a plurality of longitudinal passages in said frame, one of said passages having an inlet for said medium, another of said passages having an outlet for said medium and apertures through a wall of said nozzle block communicating with said passages.

VERNI J. CHAPMAN.